UNITED STATES PATENT OFFICE.

KARL STEPHAN AND PAUL HUNSALZ, OF BERLIN, GERMANY, ASSIGNORS TO CHEMISCHE FABRIK AUF ACTIEN, (VORM. E. SCHERING,) OF BERLIN, GERMANY.

PROCESS OF MAKING DIALKYL BARBITURIC ACID.

SPECIFICATION forming part of Letters Patent No. 780,241, dated January 17, 1905.

Application filed September 27, 1904. Serial No. 226,213.

*To all whom it may concern:*

Be it known that we, KARL STEPHAN and PAUL HUNSALZ, subjects of the German Emperor, residing at Berlin, Kingdom of Prussia, German Empire, have invented a new and useful Improvement in Processes of Manufacturing Dialkyl Barbituric Acids, of which the following is a specification.

According to our invention dialkyl barbituric acids, which are known as valuable soporifics and which have the general formula,

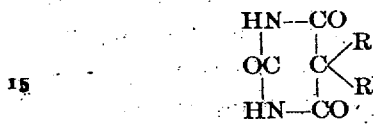

(in this formula R is meant for an alkyl group,) are manufactured by oxidizing in acid solution the corresponding dialkyl-malonyl-guanidins, answering the general formula:

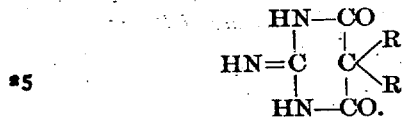

These guanidin derivatives do not possess any fixed melting-point and are insoluble in water and chloroform. A good yield of the required dialkyl barbituric acids is quite easily obtained in this manner.

By the action of the oxidizing agent in acid solution the imido group (NH) is not merely split off by the acid, but oxidation really takes place. Thus, for example, by the action of nitric oxid upon guanin xanthin is produced, whereas xanthin is not formed when guanin is acted upon by acids. It is similar in the following cases. If, for example, acetic acid is allowed to react upon diethyl-malonyl-guanidin, no trace of diethyl barbituric acid is obtained. If, however, an oxidizing agent, such as sodium nitrite, is added to the acetic acid, complete conversion ensues. If mineral acids be employed, the conversion takes place more quickly in the presence of an oxidizing agent than with no oxidizing agent.

The dialkyl barbituric acids may, for instance, be obtained in the following ways:

First. One kilogram of diethyl-malonyl-guanidin (which is made either by allowing guanidin rhodanate and sodium alcoholate to react upon diethyl-malonic acid ester or by starting from monoethyl-malonic acid ester, condensing it with guanidin rhodanate and sodium alcoholate and then inserting the second ethyl group) is dissolved in seventeen grams of dilute sulfuric acid, (twelve per cent.,) and when the mixture is at 100° centigrade a concentrated aqueous solution of sodium nitrite is added to it while stirring well. After cooling the mixture is made exactly neutral with ammonia. By concentrating the liquid the diethyl barbituric acid, which is with difficulty soluble in water, separates out. By recrystallizing from water the product is further purified.

Second. One kilogram of diethyl-malonyl-guanidin is suspended in ten kilograms of twenty per cent. acetic acid, and one kilogram of chromic acid is slowly added to the warmed mixture. The mixture is then heated for a short time until solution takes place, and after cooling the diethyl barbituric acid is extracted from the liquid by shaking with chloroform.

Third. One kilogram of diethyl-malonyl-guanidin is suspended in ten kilograms of twenty per cent. acetic acid, and to this mixture one kilogram of sodium nitrite in solution is slowly added. The remainder of the process proceeds as above.

Fourth. One kilogram of diethyl-malonyl-guanidin has added to it a solution of one kilogram of chromic acid in thirty liters of water. After lengthened heating solution takes place. After cooling the diethyl barbituric acid formed is extracted by shaking with a solvent.

The production of other alkyl derivatives is carried out in an analogous manner by starting with the corresponding alkyl-malonyl-guanidin.

The dimethyl barbituric acid is, for instance, produced as follows: One kilogram of dimethyl-malonyl-guanidin, which is formed in an analogous manner to the diethyl compound, is dissolved in seventeen kilograms of twelve-per-cent. sulfuric acid, and at 100° centigrade a concentrated aqueous solution of sodium nitrate is added while stirring well. After cooling the mixture is made neutral with ammonia. By concentrating the liquid the dimethyl barbituric acid, which is difficultly soluble in cold water, separates out. It has a melting-point of 265° centigrade.

We claim as our invention—

1. Process of producing dialkyl barbituric acids, having the hereinbefore-mentioned general formula, which consists in oxidizing the corresponding dialkyl-malonyl-guanidins in the presence of acids and separating the dialkyl barbituric acids thus formed, substantially as described.

2. Process of producing diethyl barbituric acid, which consists in oxidizing diethyl-malonyl-guanidin in acid solution and separating the diethyl barbituric acid thus formed, substantially as described.

In testimony whereof we have hereunto set our names in the presence of two subscribing witnesses.

KARL STEPHAN.
PAUL HUNSALZ.

Witnesses:
 HENRY HASPER,
 WOLDEMAR HAUPT.

---

Correction in Letters Patent No. 780,241.

It is hereby certified that in Letters Patent No. 780,241, granted January 17, 1905, upon the application of Karl Stephan and Paul Hunsalz, of Berlin, Germany, for an improvement in "Processes of making Dialkyl Barbituric Acid," an error appears in the printed specification requiring correction, as follows: In line 5, page 2, the word "nitrate" should read *nitrite;* and that the said Letters Patent should be read with this correction therein that the same may conform to the record of the case in the Patent Office.

Signed and sealed this 14th day of February, A. D., 1905.

[SEAL.]

F. I. ALLEN,
*Commissioner of Patents.* in an analogous manner to the diethyl compound, is dissolved in seventeen kilograms of twelve-per-cent. sulfuric acid, and at 100° centigrade a concentrated aqueous solution of sodium nitrate is added while stirring well. After cooling the mixture is made neutral with ammonia. By concentrating the liquid the dimethyl barbituric acid, which is difficultly soluble in cold water, separates out. It has a melting-point of 265° centigrade.

We claim as our invention—

1. Process of producing dialkyl barbituric acids, having the hereinbefore-mentioned general formula, which consists in oxidizing the corresponding dialkyl-malonyl-guanidins in the presence of acids and separating the dialkyl barbituric acids thus formed, substantially as described.

2. Process of producing diethyl barbituric acid, which consists in oxidizing diethyl-malonyl-guanidin in acid solution and separating the diethyl barbituric acid thus formed, substantially as described.

In testimony whereof we have hereunto set our names in the presence of two subscribing witnesses.

KARL STEPHAN.
PAUL HUNSALZ.

Witnesses:
HENRY HASPER,
WOLDEMAR HAUPT.

---

Correction in Letters Patent No. 780,241.

It is hereby certified that in Letters Patent No. 780,241, granted January 17, 1905, upon the application of Karl Stephan and Paul Hunsalz, of Berlin, Germany, for an improvement in "Processes of making Dialkyl Barbituric Acid," an error appears in the printed specification requiring correction, as follows: In line 5, page 2, the word "nitrate" should read *nitrite;* and that the said Letters Patent should be read with this correction therein that the same may conform to the record of the case in the Patent Office.

Signed and sealed this 14th day of February, A. D., 1905.

[SEAL.]

F. I. ALLEN,
*Commissioner of Patents.*

It is hereby certified that in Letters Patent No. 780,241, granted January 17, 1905, upon the application of Karl Stephan and Paul Hunsalz, of Berlin, Germany, for an improvement in "Processes of making Dialkyl Barbituric Acid," an error appears in the printed specification requiring correction, as follows: In line 5, page 2, the word "nitrate" should read *nitrite;* and that the said Letters Patent should be read with this correction therein that the same may conform to the record of the case in the Patent Office.

Signed and sealed this 14th day of February, A. D., 1905.

[SEAL.]

F. I. ALLEN,
*Commissioner of Patents.*